March 26, 1940.  H. E. BECKER  2,195,199
APPARATUS FOR CONTROLLING ELECTRIC CIRCUITS
Filed Oct. 11, 1937
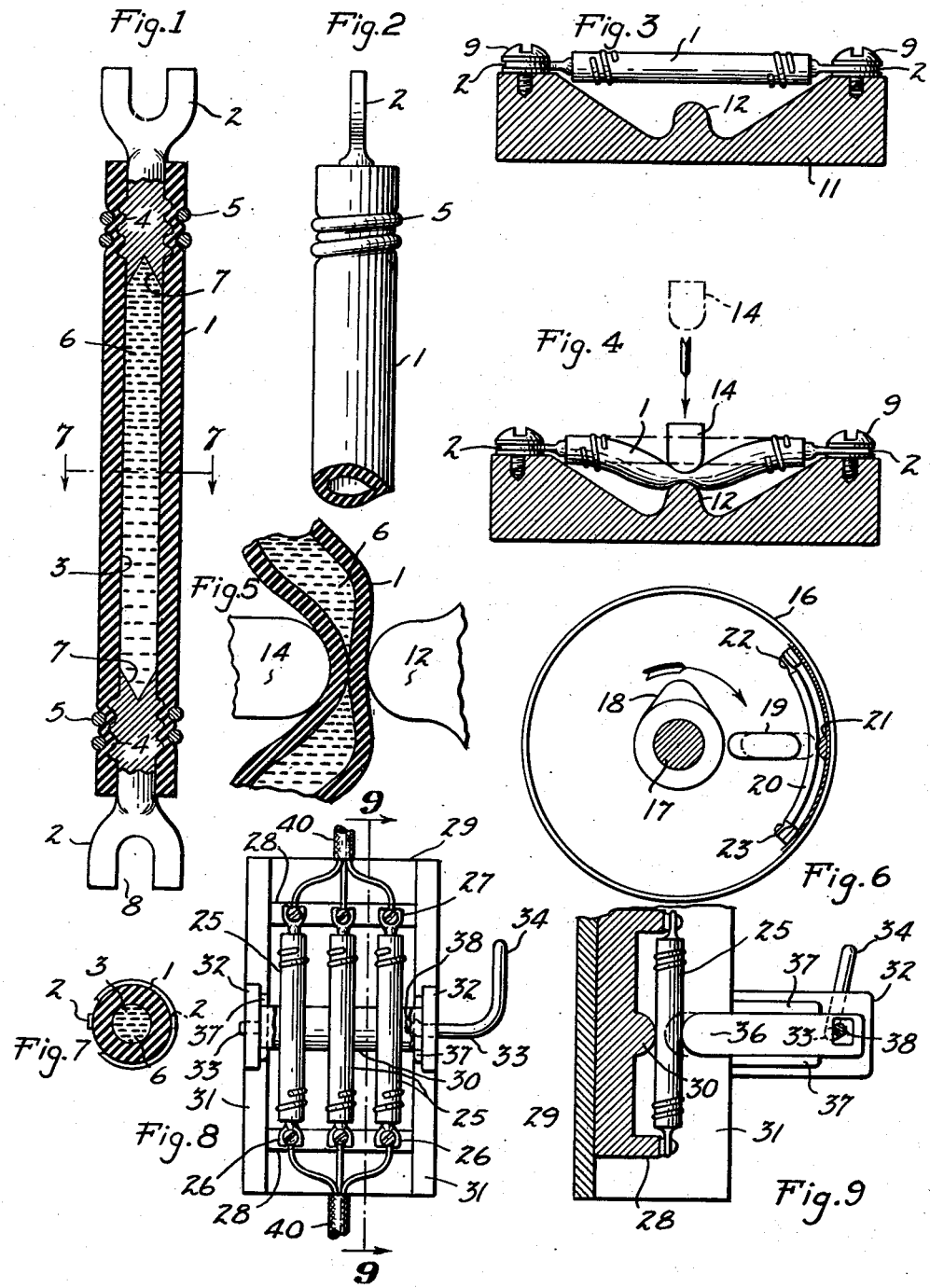
INVENTOR.
Henry E. Becker
BY Evans + McCoy
ATTORNEYS.

Patented Mar. 26, 1940

2,195,199

UNITED STATES PATENT OFFICE 2,195,199

APPARATUS FOR CONTROLLING ELECTRIC CIRCUITS

Henry E. Becker, Akron, Ohio, assignor to Amalgamated Engineering and Research Corporation, Chicago, Ill., a corporation of Illinois Application October 11, 1937, Serial No. 168,340

8 Claims. (Cl. 200—152)

This invention relates to electrical switches, and more particularly to devices of this character which employ an electrical conducting fluid.

An object of the invention is to provide a device of this character which is arranged to make and break electrical contact without objectionable pitting or corrosion of the contacting elements.

Another object is to provide an electric switch in which the making and breaking of the circuit is accomplished by means insulated from the atmosphere.

A further object is to provide a switch which embodies new and improved safety features and overload protection.

A still further object is to provide a switch which is simple in design and construction and inexpensive to manufacture.

Other objects will become apparent from the following detailed description made in connection with the accompanying drawing in which Figure 1 is a longitudinal sectional view of a switch element embodying the present invention;

Fig. 2 is an elevational view with part broken away showing one end of the switch element of Fig. 1;

Fig. 3 is a diagrammatic view, partly in section, showing one manner of utilizing the switch element shown in Figs. 1 and 2;

Fig. 4 is a view similar to Fig. 3 showing the manner in which the switch element is deformed to break the electrical connection and arrest the flow of electricity;

Fig. 5 is a diagrammatic view in section, enlarged to show the manner in which the electrical conducting fluid is parted upon deformation of the elastic casing of the switch;

Fig. 6 is a diagrammatic plan view with parts removed showing the use of the present invention in the distributor of an internal combustion engine;

Fig. 7 is a sectional view taken substantially on the line 7—7 of Fig. 1;

Fig. 8 is a diagrammatic elevational view showing the application of the present invention to a three-wire switch; and Fig. 9 is a sectional view with parts removed, taken substantially on the line 9—9 of Fig. 8.

Briefly, the present invention contemplates the enclosure of an electrical conducting fluid in a deformable casing and the insertion in the casing of electrical conducting lugs or elements so that they are in contact with the fluid. The casing being a nonconductor, insulates the lugs or elements from one another and an electric circuit is established by means of the confined fluid. When it is desired to break the electric circuit the casing is deformed to part the electrical conducting fluid intermediate its ends, thus eliminating the objectionable arcing at the conducting elements.

Referring to the drawing by numerals of reference, the invention will now be described in connection with the embodiment illustrated.

A tubular casing 1 is formed of a suitable deformable and elastic material, such as a pure rubber latex. This casing has a bore 3 extending longitudinally therethrough and receives in opposite ends substantially cylindrical shanks or electrical conducting lugs or elements 2. These elements preferably slightly distend the casing when inserted therein to establish a substantially hermetic seal. Desirably, circumferentially extending ridges 4 are formed about the shanks of the elements to assist in retaining the shanks in the casing. Helical spring elements 5 may be disposed about the casing 1 in overlying relation with respect to the shanks of the conducting elements 2 so as to force the material of the casing between the ridges 4.

A fluid chamber is thus established in the bore 3 of the casing between the internal ends of the conducting elements 2. This chamber in the casing is substantially completely filled with an electric conducting fluid 6, such as mercury.

Preferably the internal ends 7 of the shanks of the conducting elements 2 are counterbored or V-shaped to afford an increased surface area for electrical contact with the mercury 6. The ends of the conducting elements 2 which protrude from the casing 1 are distended, as shown in Fig. 2, and bifurcated as indicated at 8 to provide a socket for connection with hold-down screws 9, as illustrated in Figs. 3 and 4. In these figures the switching element is shown secured to a block 11 which supports the casing 1 in suspended position over a transversely extending rib member 12 which may be formed integral with the block 11 if desired.

In operation, electrical wires (not shown) are connected to the hold-down screws 9 at the ends of the switch elements and the electric circuit wired so that the current normally flows through the column of electrical conducting fluid 6 in the chamber of the casing 1. A reciprocable ram 14 is arranged to cooperate with the rib member 12 and squeeze the switching element to deform the casing 1, as shown in Fig. 4. This action is illustrated in the enlarged sectional view of Fig. 5. The elastic walls of the casing 1 which define the bore 3 are forced together transversely across the switch element, thus parting the electrical conducting fluid 6 intermediate the portions thereof in contact with the conducting elements 2. In this manner the electric circuit is broken and the flow of electricity through the switch is arrested. On account of the liquid mercury substantially filling the fluid chamber in the casing the electric circuit is broken while the rubber casing completely insulates the mercury from the atmosphere. In this manner objectionable arcing is prevented and such mercury as may be volatilized by the heat is immediately condensed. Accordingly, the device is not subject to pitting or corrosion of the parts in the manner of conventional knife switches, and improved operating characteristics are obtained.

In parting the mercury column intermediate the terminal conducting lugs 2 the rubber casing expands on both sides of the deformed portion thereof to accommodate the mercury forced away from the collapsed portion of the bore. This expansion of the casing stretches the rubber thereof so that, upon release of the pressure applied to collapse the tube, the mercury will automatically and immediately flow together to re-establish continuity between the terminal lugs 2 and permit the flow of electricity through the switch. Thus, the elastic casing serves a double purpose in that it not only is deformable to permit parting of the electric conducting fluid in the chamber between the terminal lugs but it also accomplishes the re-establishing of the electric contact by reason of its inherent resiliency tending to assume its normal tubular shape.

An application of the invention to an internal combustion engine distributor is illustrated in Fig. 6. A distributor casing 16 surrounds a shaft 17 driven in the usual manner in synchronization with the crank shaft of the engine. Secured on the shaft 17 within the casing 16 is a cam 18 which successively actuates a plurality of radially arranged reciprocable pressure blocks 19, one of which is indicated at 19. Supported by the side walls of the casing 16 are a plurality of the switching elements in accordance with the above description and one of which is indicated at 20. Raised portions 21 formed on the distributor casing 16 are arranged so as to be disposed transversely under central portions of the switching elements 20 and in line with the path of movement of the reciprocable pressure blocks 19. Suitable springs, (not shown) are arranged to normally retain the blocks 19 in their retracted positions indicated by the solid lines of Fig. 6. As the cam 18 is revolved in the distributor casing it successively forces the pressure blocks 19 radially outward toward raised portions 21 to substantially the position indicated by the broken lines of Fig. 6. Each pressure block thus co-operates with a corresponding raised portion 21 to deform a switching element 20 and part the column of mercury contained therein. The terminals 22 and 23 of the switching element 20 are connected in the ignition system of the engine so that the movement of the pressure blocks 19 under the influence of rotating cam 18 serves to make and break the circuit to control the operation of the engine in accordance with well known ignition practice.

Fig. 8 illustrates an adaptation of the invention to a three-wire switch. The individual switching elements indicated at 25 are supported in parallel side by side relation by their terminals 26 and 27 which are formed by the electrical conducting elements 2 previously described. The terminals 26 and 27 are secured to spaced parallel ribs 28 (Fig. 9) of a switch block 29. A raised portion 30 formed on the switch block 29 and intermediate the ribs 28 is arranged to underlie central portions of the switching elements 25 and corresponds to the rib member 12 previously described in connection with Figs. 3 and 4.

Side members 31 are arranged in spaced parallel relation on each side of the switch block and carry brackets 32 in which a shaft 33 is journaled. This shaft terminates in a handle 34 to actuate the switch, as will be later described. A knee member 36 extends transversely across the switch block 29 overlying central portions of the switching elements 25 in opposed relation with respect to the raised portion or abutment 30 previously mentioned. The knee member 36 is restricted to a reciprocable movement by guides 37 secured to the brackets 32. An offset portion 38 formed on the shaft 33 rides in an elongated slot formed in the knee member 36 so that upon movement of the handle 34 to the left, as viewed in Fig. 9, the knee member is carried to the broken line position of that figure to deform the resilient casings of the switch elements 25 and collapse the chambers therein to part the mercury contained therein and break the electric current flowing through wires 40 connected to the terminals 26 and 27. Movement of the handle 34 to the right, as viewed in Fig. 9, withdraws the knee member 36 to permit the casings of the switch elements to assume their natural shape so that the mercury flows together and re-establishes the electrical connection between the terminal lugs.

A switch embodying the present invention embodies numerous advantageous characteristics. A more efficient and desirable making and breaking of the electric circuit is accomplished. There is no arc produced between hard metal contacts or between a mercury and a metal contacting element. The only breaking and re-establishing of current flow is between portions of the mercury column, so that objectionable deterioration of hard metal contacts is substantially eliminated. Additionally, the switching elements described embody novel safety features in that they automatically protect the circuit in case of short circuit or other unexpected overload. The mercury column may be designed to accommodate a certain arrangement of current flow so that an excess thereover will heat the mercury and cause it to expand, so that a portion of it may be volatilized to break the circuit and prevent further flow of current. The natural elasticity of the rubber casing I is normally sufficient to accommodate slight increases in volume occasioned by a relatively small portion of the mercury becoming volatilized.

Other modes of applying and utilizing the principles of the invention may be employed, change being made as regards numerous details including alterations in both the design and construction, it being understood that the particular forms shown and described and the procedure set forth are presented for purposes of explanation and illustration.

What I claim is:

1. An electric circuit breaker comprising a deformable and elastic tube of rubber composition having a free inside diameter, a metal electrode secured in one end of the tube, a second metal electrode secured in the opposite end of the tube, said electrodes arranged to close the ends of the tube to define a chamber within the tube, a body of mercury substantially filling the chamber to maintain electrical contact with both electrodes regardless of the position in which the tube is disposed, and means for deforming the tube intermediate its ends to divide the chamber and separate the mercury body into individual portions in contact with the several electrodes, said tube being adapted, upon release thereof by the deforming means, to return by inherent resiliency to its normal shape with the contained mercury reunited into a single body.

2. An electric circuit breaker comprising a rubber tube, a metal electrode in each end of the tube, a body of mercury substantially filling the tube and in contact with the electrodes, and means for pinching together the walls of the tube at a central part thereof to separate the mercury body into portions each of which remains in contact with one of the electrodes.

3. An electric circuit breaker comprising a resilient, deformable member having an elongated chamber therein, a body of electrical conducting fluid substantially filling the chamber and substantially sealed from the atmosphere, and means for deforming the member to substantially collapse the walls thereof at a central part of the chamber and divide the conducting fluid into separate portions.

4. A switch for an electrical circuit comprising a flexible casing having a substantially enclosed chamber, a plurality of electrical conducting elements secured in the casing and having exposed portions within the chamber, a fluid conductor in the chamber continuous between the elements and having electrical contact therewith to permit the flow of electricity through the switch, said casing being deformable to part the fluid conductor intermediate the portions in contact with the elements and break the continuity of the fluid conductor in the chamber to arrest the flow of electricity through the switch, and means to deform the casing between the portions thereof in which the conducting elements are secured.

5. A switch for an electrical circuit comprising an elastic casing having a substantially enclosed chamber, a plurality of electrical conducting elements secured in the casing and having exposed portions within the chamber, a fluid conductor in the chamber continuous between the elements and having electrical contact therewith to permit the flow of electricity through the switch, said casing being deformable to part the fluid conductor intermediate the portions in contact with the elements and break the continuity of the fluid conductor in the chamber to arrest the flow of electricity through the switch, the casing arranged to automatically assume its normal shape after deformation to reestablish continuity of the fluid and permit the flow of electricity through the switch, and means to deform the casing between the portions thereof in which the conducting elements are secured.

6. A switch element for an electric circuit comprising an elastic tubular casing having a longitudinal bore, electrical conducting elements secured in the ends of the casing and arranged to close the ends of the bore to establish a chamber within the casing, a fluid electrical conductor confined in said chamber and having electrical contact with said elements to permit the flow of electricity through the switch, the said casing being deformable intermediate its ends to part the fluid conductor and divide the chamber into two separate chambers, each of said separate chambers being sealed against the other by the material of the deformed tubular casing, and means to deform the tubular casing as aforesaid to collapse the same and thereby form between the separate fluid chambers a mechanical lock which electrically insulates the electric conducting fluid in one of said separate chambers from the electric conducting fluid in the other of said separate chambers whereby the flow of electricity through the switch is arrested.

7. A mercury switch for an electric circuit comprising an elastic tubular casing having a longitudinal bore, electrical conducting elements secured in the ends of the casing and arranged to close the ends of the bore to establish a hermetically sealed chamber, a body of mercury in said chamber and totally filling the same, said mercury being in electrical contact with said elements to permit the flow of electricity through the switch from one element to the other, and means for collapsing the casing at a central portion thereof intermediate its ends to thereby divide the chamber into separate parts, said collapsing of the central part of the casing effecting flow of mercury therein towards the ends of the casing to distend the chamber walls, said separate parts of the chamber, upon such collapsing of the casing, being hermetically sealed one against the other both mechanically and electrically, the collapsed portions of the casing forming an electrical insulator and a mechanical lock between the separate chambers to thereby arrest the flow of electricity through the switch.

8. A switch for an electrical circuit comprising an elastic tubular casing having a longitudinal bore, electrical conducting elements secured in the ends of the casing and arranged to close the ends of the bore and establish a fluid chamber in the casing, a fluid electrical conductor confined in the chamber, said fluid substantially filling the chamber and normally continuous between the conducting elements for the flow of electricity through the switch, and the casing being deformable intermediate the ends thereof to part the fluid and arrest the flow of electricity.

HENRY E. BECKER.